`US011310460B2`

(12) United States Patent
Yu

(10) Patent No.: US 11,310,460 B2
(45) Date of Patent: Apr. 19, 2022

(54) IMAGE PROCESSING METHOD

(71) Applicant: Realtek Semiconductor Corporation, Hsinchu (TW)

(72) Inventor: Chung-Ping Yu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/152,868

(22) Filed: Jan. 20, 2021

(65) Prior Publication Data

US 2021/0360190 A1 Nov. 18, 2021

(30) Foreign Application Priority Data

May 18, 2020 (TW) ................................. 10911643.8

(51) Int. Cl.
*H04N 7/01* (2006.01)
*G09G 5/00* (2006.01)

(52) U.S. Cl.
CPC ............. *H04N 7/014* (2013.01); *G09G 5/005* (2013.01); *H04N 7/0127* (2013.01); *G09G 2340/0435* (2013.01); *G09G 2340/16* (2013.01)

(58) Field of Classification Search
CPC .... H04N 7/014; H04N 7/0127; H04N 19/117; H04N 19/132; H04N 19/139; H04N 19/513; G09G 5/005; G09G 2340/0435; G09G 2340/16
See application file for complete search history.

(56) References Cited

U.S. PATENT DOCUMENTS

| 6,381,275 | B1 * | 4/2002 | Fukuhara | H04N 19/423 |
| | | | | 375/240.06 |
| 6,760,378 | B1 * | 7/2004 | Conklin | H04N 19/80 |
| | | | | 375/240.16 |
| 7,548,276 | B2 | 6/2009 | Mizuhashi et al. | |
| 8,446,524 | B2 | 5/2013 | Chen et al. | |
| 2004/0046891 | A1 * | 3/2004 | Mishima | H04N 7/014 |
| | | | | 348/459 |
| 2004/0252764 | A1 * | 12/2004 | Hur | H04N 19/521 |
| | | | | 375/240.16 |

(Continued)

FOREIGN PATENT DOCUMENTS

| CN | 102292981 A | 12/2011 |
| CN | 106060539 A | 10/2016 |

*Primary Examiner* — Paulos M Natnael
(74) *Attorney, Agent, or Firm* — Locke Lord LLP; Tim Tingkang Xia, Esq.

(57) ABSTRACT

An image processing method includes: receiving first and second frames; generating multiple motion vectors based on the first and second frames, wherein one of the motion vectors corresponds to a first block of the first frame and a second block of the second frame; calculating a to-be-compensated position of a compensated block, a first motion vector between the compensated block and the first block, and a second motion vector between the compensated block and the second block; determining whether a sum of the to-be-compensated position, a compensation value, and the first motion vector or the second motion vector exceeds a target range in order to set a blending coefficient; modifying first data of the first block or second data of the second block based on the blending coefficient; and generating interpolated data based on the modified first data or the modified second data.

10 Claims, 7 Drawing Sheets

(56) References Cited

U.S. PATENT DOCUMENTS

2010/0245664 A1* 9/2010 Wu .................. H04N 7/014
                                                      348/441
2017/0019624 A1* 1/2017 Mendelenko ........ H04N 19/573

* cited by examiner

IMAGE PROCESSING METHOD

RELATED APPLICATIONS

This application claims priority to Taiwan Application Serial Number 109116438, filed May 18, 2020, which is herein incorporated by reference.

BACKGROUND

Field of Invention

The present disclosure relates to an image processing method. More particularly, the present disclosure relates to an image processing method for solving the problem of image frame discontinuity.

Description of Related Art

In the field of image processing, when applying the motion estimation motion compensation (MEMC) to the frames with low frame rate, spatial discontinuity or temporal discontinuity can be observed on the stream in specific circumstances. For example, such discontinuity can be observed in the following cases: when the frames endure a fast update, when the motion vector directs to the points out of the boundary or the rim, when the frame includes covered or uncovered areas, and when the bi-interpolation calculation fails to retrieve valid information (e.g., invalid by search range or invalid by boundary or rim).

For the foregoing reasons, how to solve the problem of frame discontinuity is essential in the field.

SUMMARY

An aspect of the present disclosure is to provide an image processing method. The image processing method includes: receiving a first frame and a second frame; generating a plurality of motion vectors based on the first frame and the second frame, wherein one of the motion vectors corresponds to a first block of the first frame and a second block of the second frame; calculating a to-be-compensated position of a compensated block, a first motion vector between the compensated block and the first block, and a second motion vector between the compensated block and the second block; determining whether a sum of the to-be-compensated position, a compensation value, and the first motion vector or the second motion vector exceeds a target range in order to set a blending coefficient; modifying first data of the first block or second data of the second block based on the blending coefficient; and generating interpolated data based on the modified first data or the modified second data.

In summary, the motion compensation frame rate converter of the image processing device calculates, determines, and modifies the blending ratio of the two blocks used for interpolation according to the image processing method, so that the problem of frame discontinuity can be reduced.

DESCRIPTION OF THE EMBODIMENTS

Reference will now be made in detail to the present embodiments of the present disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of components with equivalent effects are within the scope of the present disclosure.

Figure 1:
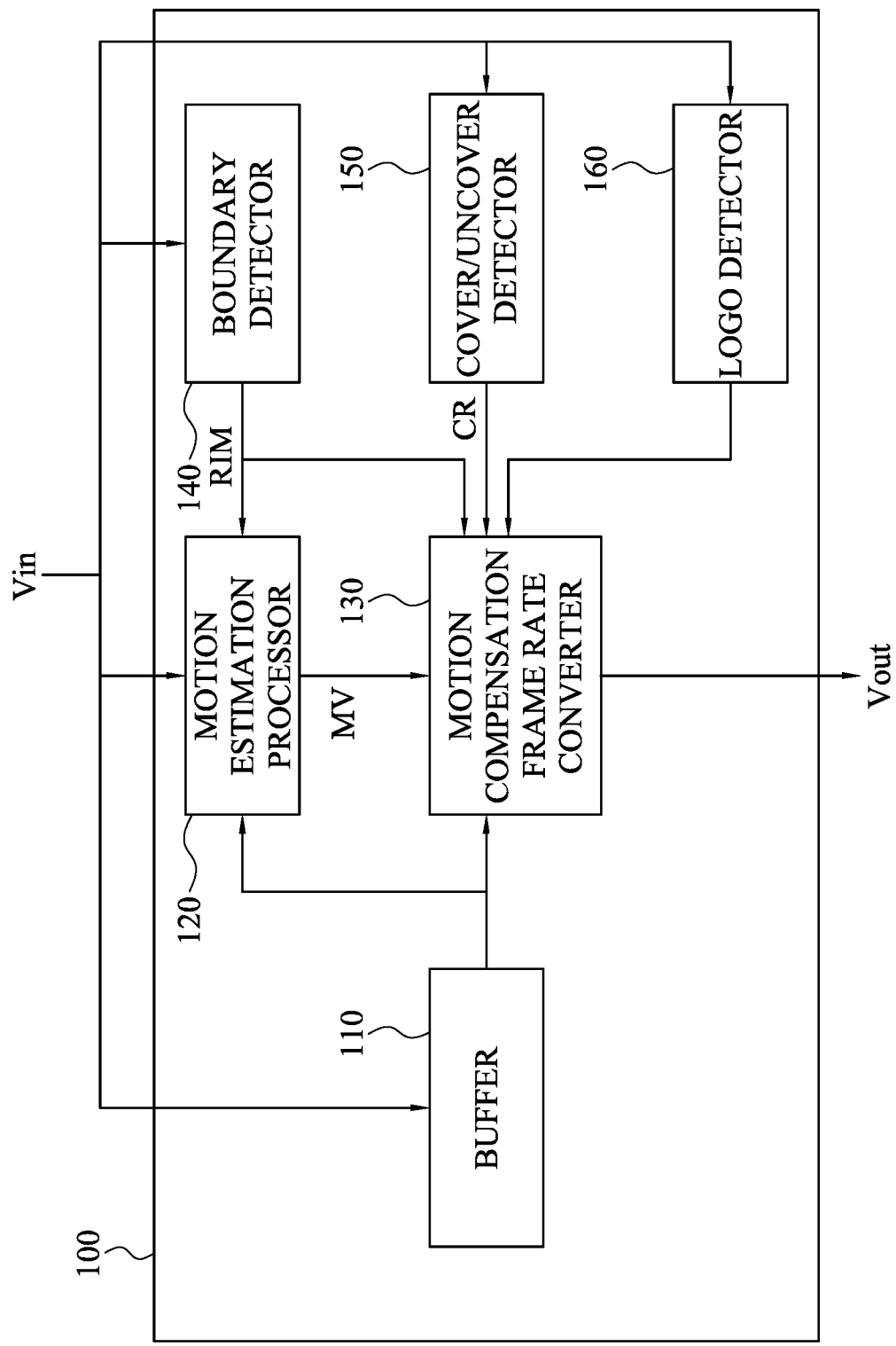
FIG. 1 depicts a schematic diagram of an image processing device according to one embodiment of the present disclosure.

A description is provided with reference to FIG. 1. FIG. 1 depicts a schematic diagram of an image processing device 100 according to one embodiment of the present disclosure. As shown in FIG. 1, the image processing device 100 comprises a buffer 110, a motion estimation processor 120, a motion compensation frame rate converter 130, a boundary detector 140, a cover/uncover detector (or a de-halo detector) 150, and a logo detector 160. In view of the system structure, the buffer 110 is connected to the motion estimation processor 120 and the motion compensation frame rate converter 130. The boundary detector 140 is connected to the motion estimation processor 120 and the motion compensation frame rate converter 130. The cover/uncover detector 150 and the logo detector 160 are connected to the motion compensation frame rate converter 130.

In view of the system operation, the buffer 110 is configured to receive an image input signal Vin, perform a buffering process to the image input signal Vin and transmit the processed image input signal Vin to the motion estimation processor 120 and/or the motion compensation frame rate converter 130. The boundary detector 140 is configured to receive the image input signal Vin, detect four edges RIM (i.e., upper, lower, left, and right) of an input image based on the image input signal Vin, and define an area enclosed by those four edges RIM as a frame area. In greater detail, the boundary detector 140 can obtain the four edges RIM based on an image size corresponding to the image input signal Vin. In some embodiments, the boundary detector 140 can detect black rims in the image input signal Vin (can be understood as the image itself carried by the signal) and the frame area can be an area with the black rims being subtracted.

The cover/uncover detector 150 is configured to receive the image input signal Vin and obtain a cover/uncover area CR between two successive frames of the input image based on the image input signal Vin. The logo detector 160 is configured to obtain a logo, such as a channel logo, in the input image based on the image input signal Vin.

The motion estimation processor 120 is configured to receive the image input signal Vin and the detected edges RIM, perform a motion estimation (ME) based on the image input signal Vin and the edges RIM, and transmit a generated motion vector to the motion compensation frame rate converter 130. The motion compensation frame rate converter 130 is configured to receive the image input signal Vin, the edges RIM, and the cover/uncover area CR and perform a frame interpolation compensation based on the image input signal Vin, the edges RIM, and the covered/uncovered area CR. The motion compensation frame rate converter 130 can output a video output signal Vout with a converted frame rate.

Figure 2:
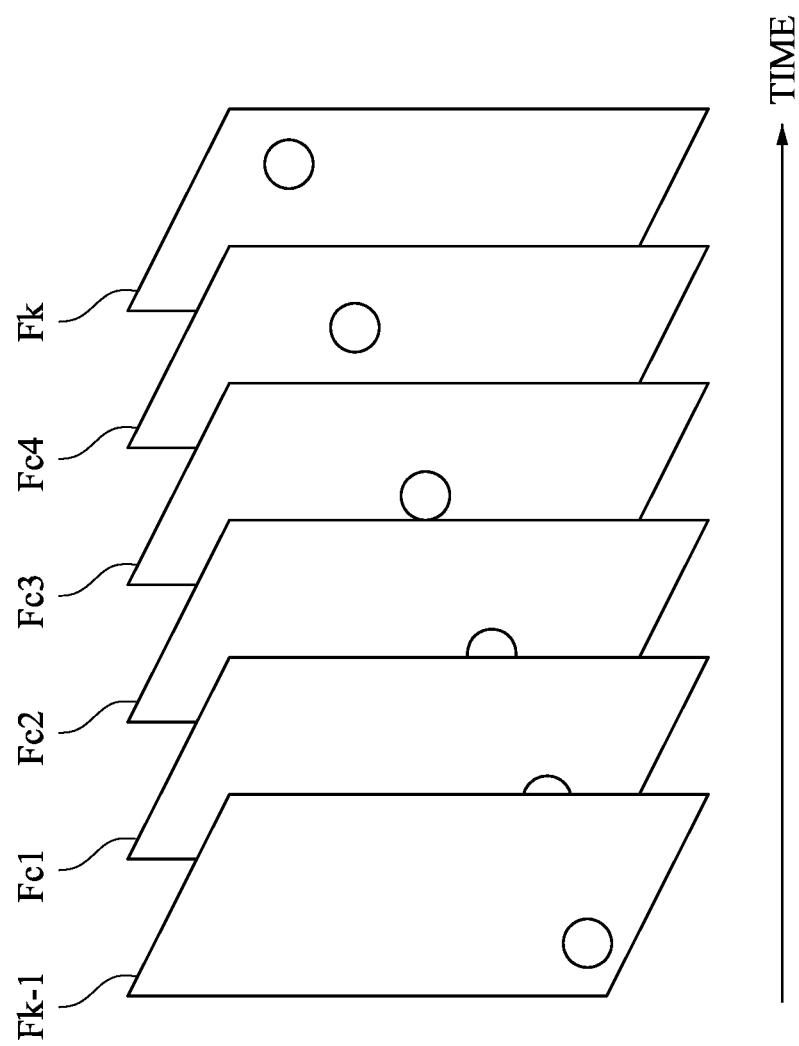
FIG. 2 depicts a schematic diagram of successive frames of an image according to one embodiment of the present disclosure.

For example, as shown in FIG. 2, a frame Fk is a current frame in the image input signal Vin received by the image processing device 100. A frame Fk-1 is a reference picture in the image input signal Vin corresponding to the current frame. In some embodiments, the frame Fk and the frame Fk-1 are two successive frames. The motion estimation processor 120 divides the frame Fk-1 and the frame Fk into multiple corresponding blocks and each block is in size of i*j. The motion estimation processor 120 executes various motion vector search methods to find a preferred motion vector for each of the blocks and sends the preferred motion vector to the motion compensation frame rate converter 130.

After that, the motion compensation frame rate converter 130 generates a compensated frame between the frame Fk-1 and the frame Fk based on the frame Fk-1, the frame Fk, and the preferred motion vector of each of the blocks. For example, if the preferred motion vector is a vector substantially directed from the lower left to the upper right of the frame (shown as a circle-shaped object moving from the lower left corner of the frame Fk-1 to the upper right corner of frame Fk), the motion compensation frame rate converter 130 can generate the compensated frame as shown in frames Fc1~Fc4 based on the circle-shaped object in the frame Fk-1 and the frame Fk. In other words, the image processing device 100 can execute the image processing method to output the image output signal Vout including the frame Fk-1, the frame Fc1~Fc4 and the frame Fk.

Figure 3:
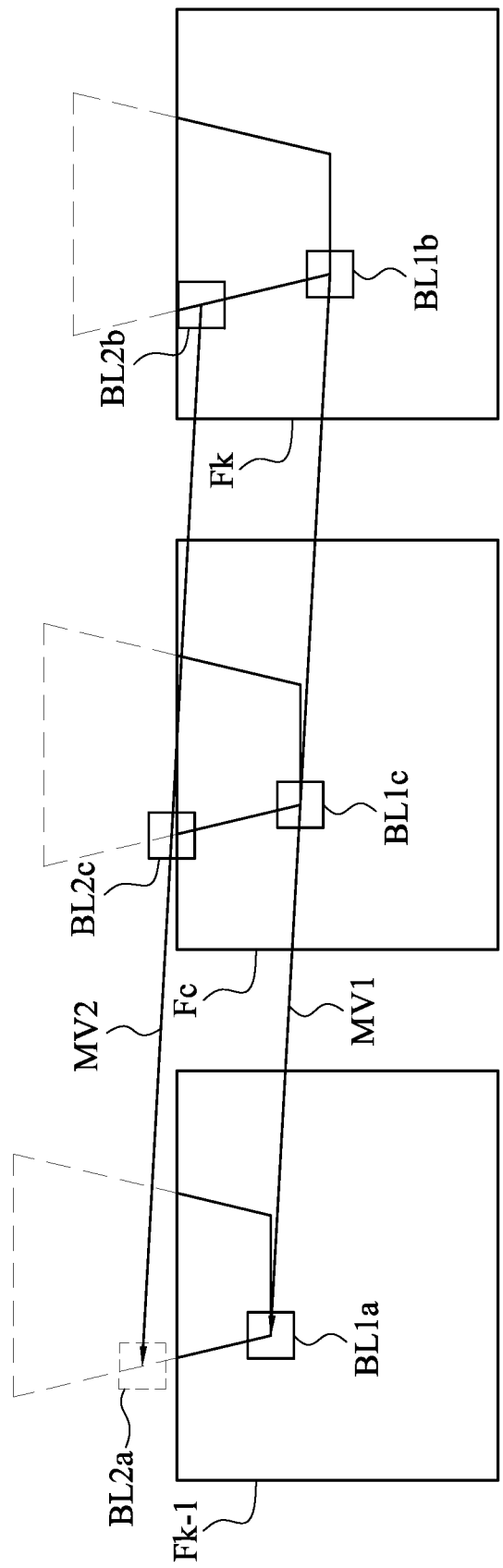
FIG. 3 depicts a schematic diagram of an interpolated image according to one embodiment of the present disclosure.

However, when the motion vector being used to generate the compensation frame directs to the positions out of the boundary of the frame or the rim of the frame, the interpolation compensation can retrieve no reference data or invalid data and cause discontinuous compensated frames in view of the frame contents or the timeline. For example, as shown in FIG. 3, a frame Fc is the compensated frame generated based on the current frame Fk and the reference frame Fk-1. Theoretically, a block BL1c of the frame Fc is an weighted average frame based on a blocks BL1a and a BL1b corresponding to a motion vector MV1 with a weight of 0.5 for each reference block. With regard to a block BL2c, blocks BL2a and block BL2b can be used as references when calculating a motion vector MV2. However, the block BL2a is out of an edge of the frame so that the reference to the block BL2a would be unsuccessful. If the motion vector MV2b directs to the block BL2a that cannot be referenced, the weighted average can generate a discontinuous compensated block BL2c. For the above problem, the present disclosure provides the following image processing method as a solution.

Figure 4:
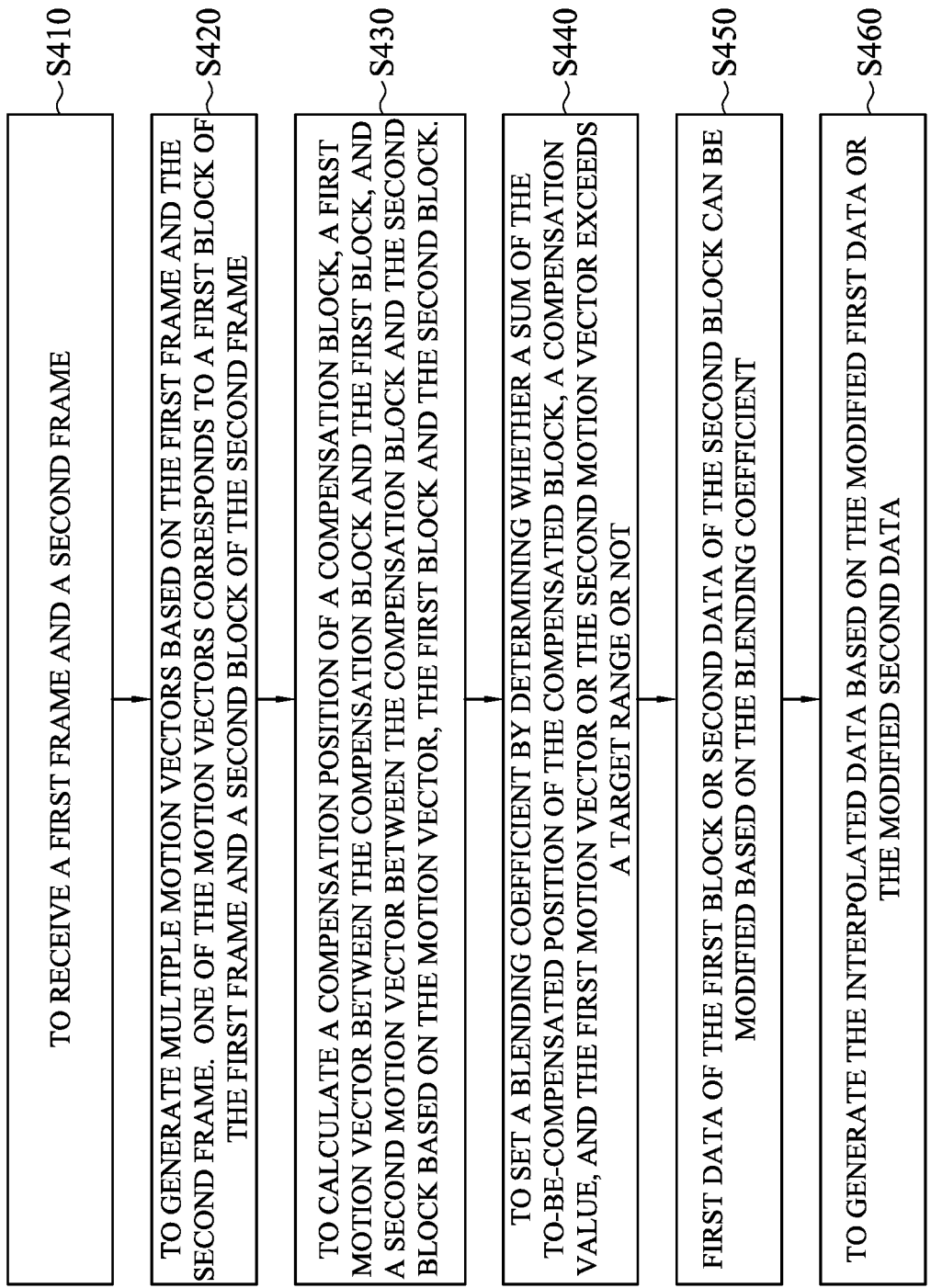
FIG. 4 depicts a flowchart of an image processing method according to one embodiment of the present disclosure.

Reference is made to FIG. 4. FIG. 4 depicts a flowchart of an image processing method 400 according to one embodiment of the present disclosure. For better understandings, the following image processing method 400 is described with reference to the embodiments shown in FIGS. 1-7, but the present disclosure is not limited to these embodiments. Those skilled in the art can make various modifications and variations to the present disclosure without departing from the spirit and scope of the present disclosure. As shown in FIG. 4, the image processing method 400 comprises operations S410, S420, S430, S440, S450, and S460.

First, the operation S410 is to receive a first frame and a second frame. In greater detail, the motion estimation processor 120 in the image processing device 100 receives two different frames carried by the image input signal Vin, as shown in FIG. 1. In some embodiments, the first frame and the second frame may be two successive frames, such as the current frame Fk and the reference frame Fk-1 in FIG. 2.

Next, the operation S420 is to generate multiple motion vectors based on the first frame and the second frame. One of the motion vectors corresponds to a first block of the first frame and a second block of the second frame. In greater detail, the motion estimation processor 120 divides the current frame Fk into multiple current blocks each in a fixed size. To simplify matters, an expression of i*j matrix is introduced to represent these current blocks in the following paragraphs. After that, the motion estimation processor 120 searches the blocks in the reference frame Fk-1 to select a reference block with the highest matching degree corresponding to each of the current blocks and uses a vector between the current block and the corresponding reference block as a motion vector of the current block. In some embodiments, the calculation of the matching degree can be implemented with sum of absolute differences (SAD) algorithms, but the present disclosure is not limited thereto. In some other embodiments, mean square error (MSE) algorithms or mean absolute deviation (MAD) algorithms may be used.

As a result, the motion estimation processor 120 can calculate motion vectors corresponding to i*j current blocks based on the frame Fk and the frame Fk-1.

Figure 5:
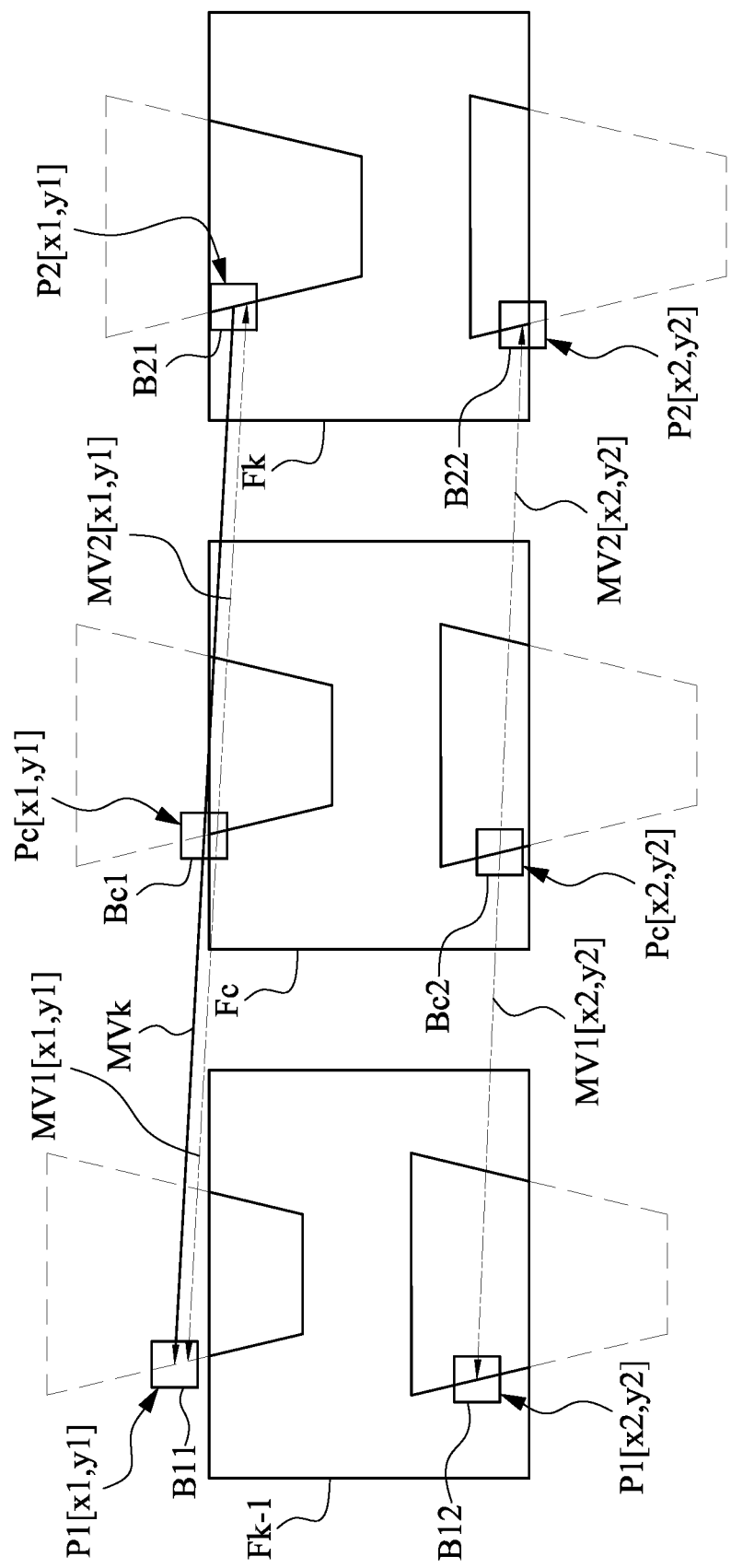
FIG. 5 depicts a schematic diagram of another interpolated image according to one embodiment of the present disclosure.

The operation S430 is to calculate a compensation position of a compensation block, a first motion vector between the compensation block and the first block, and a second motion vector between the compensation block and the second block based on the motion vector, the first block and the second block. In greater detail, an example regarding a motion vector MVk, a block B11 and a block B21 in FIG. 5 is explained in the following. The motion compensation frame rate converter 130 can calculate a to-be-compensated position of a compensated block Bc1 based on the motion vector MVk, the block B11 and the block B21. As shown in FIG. 5, a to-be-compensated position Pc[x1, y1] of the compensated block Bc1 is a midpoint of a position P1[x1, y1] corresponding to the block B11 and a position P2[x1, y1] corresponding to the block B21. In addition, The motion compensation frame rate converter 130 can use a vector MV1[x1, y1] between the to-be-compensated position Pc[x1, y1] of the compensated block Bc1 and the position P1[x1, y1] of the block B11 as the first vector, and use a vector MV2[x1, y1] between the position Pc[x1, y1] of the compensated block Bc1 and the position P2[x1, y1] of the block B21 as the second vector.

As a result, the motion estimation processor 120 can calculate to-be-compensated positions of i*j compensated blocks (such as a position P[i, j] in FIG. 6), i*j first motion vectors (such as MV1[i, j] in FIG. 6), and i*j second motion vectors (such as MV2[i, j] in FIG. 6) based on positions of the i*j current blocks and positions of i*j reference blocks corresponding to the current blocks.

Figure 6:
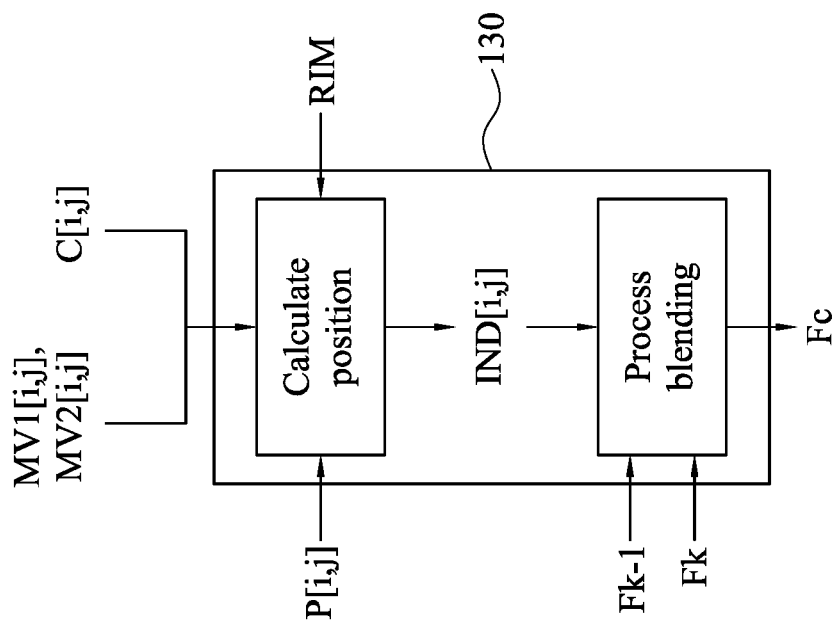
FIG. 6 depicts a functional block diagram of a motion compensation frame rate converter according to one embodiment of the present disclosure.

The operation S440 is to set a blending coefficient by determining whether a sum of the to-be-compensated position of the compensated block, a compensation value, and the first motion vector or the second motion vector exceeds a target range or not. In greater detail, as shown in FIG. 6, the motion compensation frame rate converter 130 calculates positions of the first block and the second block corresponding to the compensated block based on the compensated position P[i, j], the first motion vector MV1[i, j], the second motion vector MV2[i, j], and a compensation value C[i, j] of the compensated block, and determines whether the first block or the second block (i.e., the current block or the reference block) exceeds the target range (i.e., the area enclosed by the four edges RIM). If the first block or the second block exceeds the target range, a blending coefficient IND[i, j] is set based on a degree that the block exceeds the target range. If the first block or the second block does not exceed the target range, the blending coefficient IND[i, j] of the first block or the second block is set to be "zero" or "fail", which means that the block does not require further processing.

For example, when the sum of the to-be-compensated position of the compensated block, the first motion vector and the compensation value does not exceed the target range, then the blending coefficient of the first block can be set to zero. When the sum of the compensation position of the to-be-compensated block, the second motion vector and the compensation value does not exceed the target range, the blending coefficient of the second block can be set to zero. Additionally, when the sum of the to-be compensated position of the compensated block, the first motion vector and the compensation value exceeds the target range, the blending coefficient of the first block can be set to an interpolation value of the two. When the to-be compensated position of the compensated block, the second motion vector and the compensation value exceeds the target range, the blending coefficient of the second block can be set to the interpolation value of the two.

A further detailed description is provided. As shown in the following formula (1), Px represents the abscissa of the to-be compensated position of the compensated block, and Py represents the ordinate of the to-be compensated position of the compensated block. MVx represents the abscissa of the first motion vector or the second motion vector, and MVy represents the ordinate of the first motion vector or the second motion vector. OFFSET represents the compensation value. RIMtop, RIMbottom, RIMleft, and RIMright represents the top, the bottom, the left, and the right boundaries of the input image, respectively, and each of them is defined by a number of coordinate values on the corresponding boundary. IND[x, y] represents the blending coefficient of the first block or the second block.

$$\text{If} \begin{cases} [(Py + MVy + \text{OFFSET}) < RIMtop] \\ \text{OR } [(Px + MVx + \text{OFFSET}) > RIMright] \\ \text{OR } [(Py + MVy + \text{OFFSET}) > RIMbottom] \\ \text{OR } [(Px + MVx + \text{OFFSET}) < RIMleft] \end{cases} \quad \text{Formula (1)}$$

$IND[x, y] = \text{OFFSET}$

Else $IND[x, y] = 0$

As shown in FIG. 5, since the sum of the position Pc[x1, y1] of the compensated block Bc1, the first motion vector MV1[x1, y1] and the compensation value directs to a coordinate outside the upper boundary RIMtop, the blending coefficient of the first block B11 is set to the compensation value "OFFSET" according to formula (1). Since the sum of the position Pc[x1, y1] of the compensated block Bc1, the second motion vector MV2[x1, y1] and the compensation value directs to a coordinate within the input image defined by the four boundaries, the blending coefficient of the second block B21 is set to zero according to formula (1).

As shown in FIG. 5, since the sum of the position Pc[x2, y2] of the compensated block Bc2, the first motion vector MV1[x2, y2] and the compensation value directs to a coordinate within the input image defined by the four boundaries, the blending coefficient of the first block B12 is set to "zero" according to formula (1). Since the sum of the position Pc[x2, y2] of the compensated block Bc2, the second motion vector MV2[x2, y2] and the compensation value directs to a coordinate outside the lower boundary RIMbottom, the blending coefficient of the second block B22 is set to the compensation value "OFFSET" according to formula (1).

It is noted that the compensation value OFFSET represents a range of the process, which is user-definable. In addition to that, the compensation value OFFSET can be multiplied by a gain in some embodiments and the gain can be controlled with firmware. In other words, the compensation value OFFSET can be modified.

After that, in operation S450, the first data of the first block or the second data of the second block can be modified based on the blending coefficient. In greater detail, as shown in FIG. 6, the motion compensation frame rate converter 130 modifies the data corresponding to various blocks of the frame Fk and the frame Fk-1 based on the blending coefficient IND[i, j].

A further description is provided. When one of the two blending coefficients of the first block and the second block is zero and another is non-zero, the block data corresponding to the block having non-zero blending coefficient is modified according to the block data corresponding to the block having zero coefficient. For example, as shown in the following formula (2), INDa[x, y] represents the blending coefficient of the first block and INDb[x, y] represents the blending coefficient of the second block. DATAa[x, y] represents the first data of the first block and DATAb[x, y] represents the second data of the second block. R represents the rounding bit.

$$\text{If}(INDa[x, y] == 0 \text{ AND } INDb[x, y] \mathrel{!}= 0) \quad \text{Formula (2)}$$

$$DATAb[x, y] = \frac{INDb[x, y] * DATAb[x, y] + (\text{MODE} - INDb[x, y]) * INDa[x, y] + R}{\text{MODE}}$$

Else If$(INDb[x, y] == 0 \text{ AND } INDa[x, y] \mathrel{!}= 0)$ $$DATAa[x, y] = \frac{INDa[x, y] * DATAa[x, y] + (\text{MODE} - INDa[x, y]) * INDb[x, y] + R}{\text{MODE}}$$

As shown in FIG. 5, since the blending coefficient INDa [x, y] of the block B11 is not zero and the blending coefficient INDb[x, y] of the block B21 is zero, the data of the new block B11 can be generated by weighted averaging the data of the block B21 and the data of the block B11 based on the ratio of INDb[x, y] and (MODE-INDb[x, y]). In addition, since the blending coefficient INDb[x, y] of the block B22 is not zero and the blending coefficient INDa[x, y] of the block B12 is zero, the data of the new block B22 can be generated by weighted averaging the data of the block B12 and the data of the block B22 based on the ratio of INDa[x, y] and (MODE-INDa[x, y]).

In some embodiments, MODE can be a value set to match the compensation value OFFSET, which can be, but not limited to, 32 or 64. Those of ordinary skill in the art can control this value depending on practical applications.

The operation S440 is to determine whether the calculation result (i.e. the summation) exceeds any boundary based on each of the top, the bottom, the left and the right boundaries RIMtop, RIMbottom, RIMleft, and RIMright. The excess value (i.e., the part that goes out of the boundary) is recorded to be a ratio for the blending coefficient modification in operation S450. In other words, the first blending coefficient is positively correlated with an excess value that the first block exceeds the boundaries RIM. The second blending coefficient is positively correlated with an excess value that the second block exceeds the boundaries RIM. As a result, those blocks that were compensated with single interpolation can still be compensated with single interpolation. Those blocks that were compensated with bi-interpolation being determined as not exceeding the target range, can still be compensated with bi-interpolation. This approach provides an alternative between the single interpolation and the bi-interpolation and can still reduce the problem of frame discontinuity.

The operation S460 is to generate the interpolated data based on the modified first data or the modified second data. In greater detail, as shown in FIG. 6, the motion compensation frame rate converter 130 performs a weighted average with a weight of 0.5 for each of the first data and the second data in order to generate the interpolated data based on the modified first data corresponding to the first block and the modified second data corresponding to the second block. However, the present disclosure is not limited thereto. Those of ordinary skill in the art can control this value depending on practical applications.

Therefore, calculating whether the position of the block used for interpolation exceeds the boundaries or not determines whether such block can cause the discontinuity. When performing the bi-interpolation, if the interpolation retrieves invalid or unavailable (that is, the frame discontinuity is possibly caused) data from one block in these two frames, modified data corresponding to this block can be generated based on a reference block of this block and aforementioned weighted calculation. In other words, by using the blending coefficients to modify the blending ratio of the two blocks in the interpolation, the generated compensated block is much similar to the block with valid data. In this manner, the frame discontinuity can be avoided by excluding inappropriate data.

In some other embodiments, the target range may be the covered/uncovered area CR when performing the operation S440 of the image processing method 400. In the input image, an area in the previous frame being covered (e.g., by some objects) in the subsequent frame is the "covered area". Additionally, an area in the subsequent frame that is not shown in the previous frame is the "uncovered area". In greater detail, the motion compensation frame rate converter 130 determines whether the first block or the second block (i.e., the current block or the reference block) exceeds the covered/uncovered area CR obtained by the cover/uncover detector 150. If it is determined that the first block or the second block exceeds the covered/uncovered area CR, the blending coefficient IND[i, j] is set based on the size of the excess part. If it is determined that the first block or the second block fails to exceed the covered/uncovered area CR, the blending coefficient IND[i, j] of the first block or the second block is set to "zero" or "fail", which means that the block does not require further processing.

Figure 7:
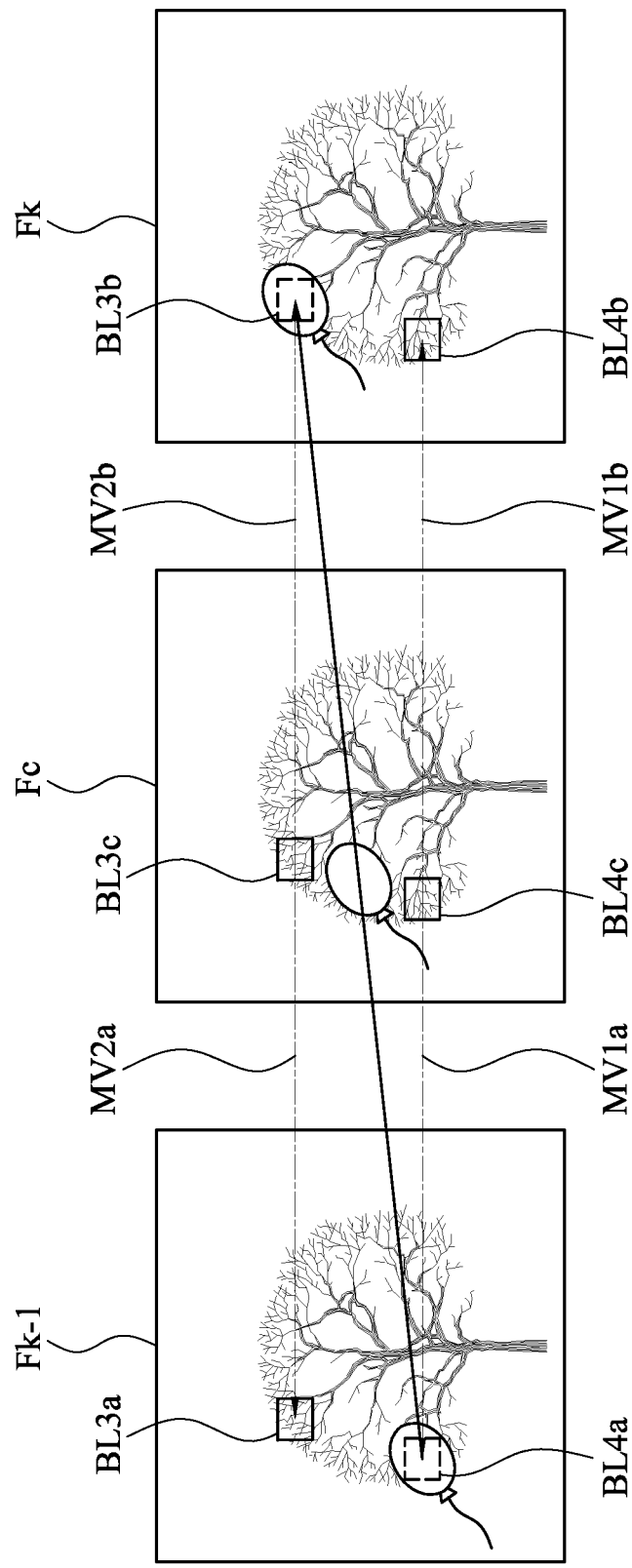
FIG. 7 depicts a schematic diagram of another interpolated image according to one embodiment of the present disclosure.

For example, as shown in FIG. 7, the area covered by the balloon in the current frame Fk is a covered area from the viewpoint of the reference frame Fk-1, and the area which was covered by the balloon in the reference frame Fk-1 but revealed in the current frame Fk is an uncovered area from the viewpoint of the reference frame Fk-1. Take a compensated block BL3c as an example, since a second block BL3b falls within the covered/uncovered area CR, the blending coefficient of the second block BL3b is zero, the block data can be modified based on the blending coefficient of the first block BL3a. Additionally, take a compensated block BL4c as an example, since a first block BL4a falls within the covered/uncovered area CR, the blending coefficient of the first block BL4a is zero, the block data can be modified based on the blending coefficient of the second block BL4b.

Therefore, by calculating whether the position of the block used for interpolation falls within the covered/uncovered area CR, it can determine whether the block can cause frame discontinuity. When performing the bi-interpolation, if the two frame blocks used for interpolation both fall within the covered/uncovered area CR, the data corresponding to the block located in the uncover area can be used as reference to modify the data corresponding to the block located in the cover area with a weighted calculation. In other words, by using the blending coefficients to modify the blending ratio of the two blocks when performing the interpolation, the generated compensated block is much similar to the block with valid data. In this manner, the frame discontinuity can be avoided by excluding inappropriate data.

In summary, the motion compensation frame rate converter 130 of the image processing device 100 calculates, determines, and modifies the blending ratio of the two blocks used for interpolation according to the image processing method 400, so that the problem of frame discontinuity can be reduced. In addition, the image processing method 400 according to the present disclosure does not require a hardware line buffer, which can reduce costs.

Although the present disclosure has been described in considerable detail with reference to certain embodiments thereof, other embodiments are possible. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. An image processing method comprising:
    receiving a first frame and a second frame;
    generating multiple motion vectors based on the first frame and the second frame, wherein one of the motion vectors corresponds to a first block of the first frame and a second block of the second frame;

calculating a to-be-compensated position of a compensated block, a first motion vector between the compensated block and the first block, and a second motion vector between the compensated block and the second block;

determining whether a sum of the to-be-compensated position, a compensation value, and the first motion vector or the second motion vector exceeds a target range in order to set a blending coefficient;

modifying first data of the first block or second data of the second block based on the blending coefficient; and generating interpolated data based on the modified first data or the modified second data.

2. The image processing method of claim 1, wherein setting the blending coefficient comprises:

setting a first blending coefficient of the first block to the compensation value when a sum of the to-be-compensated position, the first motion vector and the compensation value exceeds the target range;

setting a second blending coefficient of the second block to the compensation value when a sum of the compensation position, the second motion vector and the compensation value exceeds the target range;

setting the first blending coefficient to "fail" when the sum of the compensation position, the first motion vector and the compensation value fails to exceed the target range; and marking the second blending coefficient to "fail" when the sum of the compensation position, the second motion vector and the compensation value fails to exceed the target range.

3. The image processing method of claim 2, wherein modifying the first data or the second data based on the blending coefficient comprises:

modifying the first data based on the second data and the second blending coefficient when the first blending coefficient is not zero and the second blending coefficient is set to "fail"; and modifying the second data based on the first data and the first blending coefficient when the first blending coefficient is set to "fail" and the second blending coefficient is not zero.

4. The image processing method of claim 2, wherein the first blending coefficient is positively correlated with a value of the sum exceeding the target range, the second blending coefficient is positively correlated with the value of the sum exceeding the target range.

5. The image processing method of claim 1, wherein the target range comprises a frame area or a covered/uncovered area.

6. The image processing method of claim 5, further comprising:

obtaining four boundaries of an input image by using a boundary detector; and using an area enclosed by the four boundaries as the frame area.

7. The image processing method of claim 5, further comprising:

detecting the covered/uncovered area in the first frame and the second frame by using a covered/uncovered detector.

8. The image processing method of claim 1, wherein calculating the to-be-compensated position comprises:

calculating a midpoint of the first block and the second block as the to-be-compensated position.

9. The image processing method of claim 1, wherein the compensation value is controllable.

10. The image processing method of claim 1, wherein generating the interpolated data comprises:

calculating an arithmetic mean of the first data and the second data as the interpolated data.

* * * * *